No. 801,833. PATENTED OCT. 17, 1905.
C. M. ALLEN.
FLOW REGISTER.
APPLICATION FILED APR. 2, 1904.

3 SHEETS—SHEET 1.

Witnesses

Inventor
Charles M. Allen
By Rufus B. Fowler
Attorney.

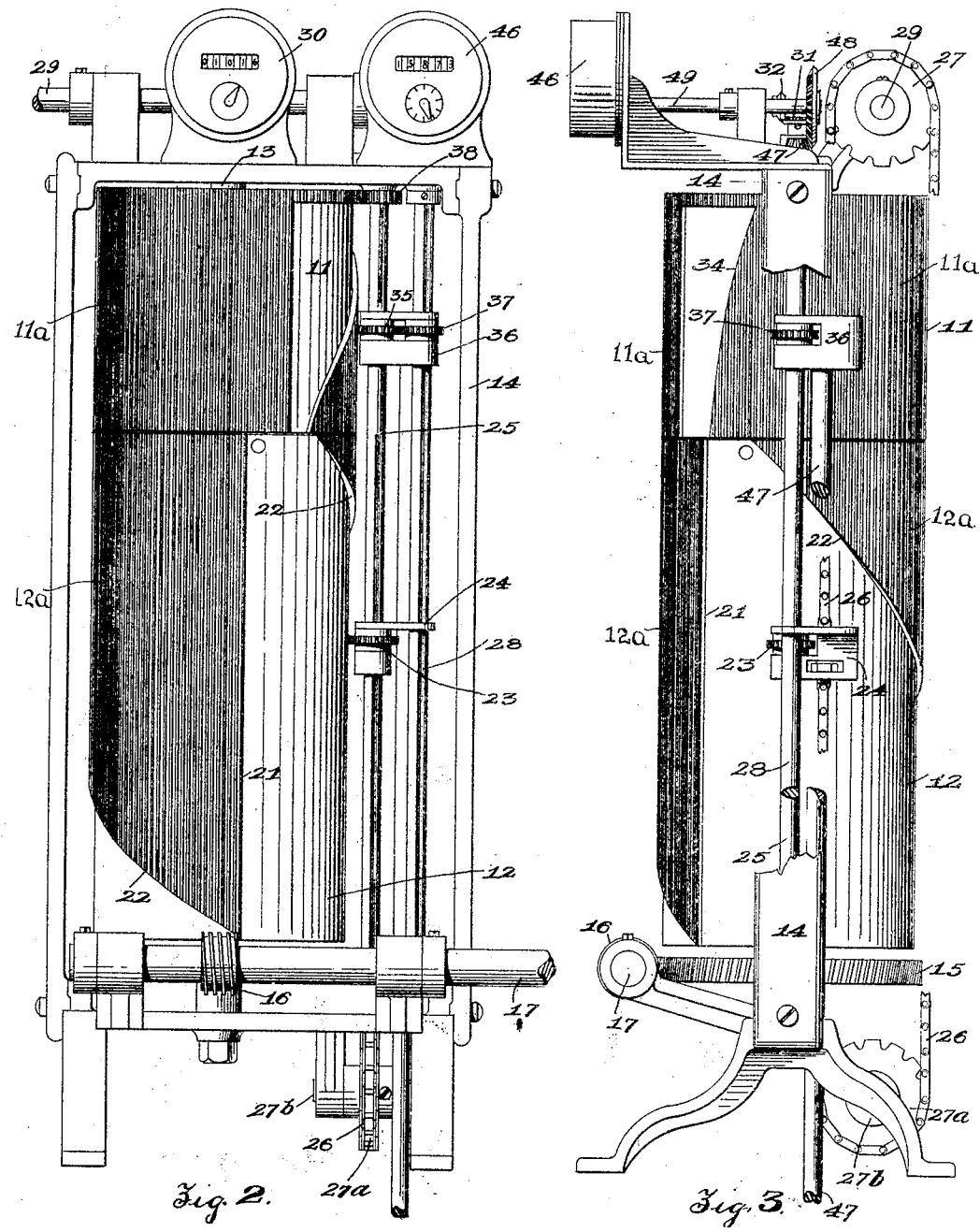

UNITED STATES PATENT OFFICE.

CHARLES M. ALLEN, OF WORCESTER, MASSACHUSETTS.

FLOW-REGISTER.

No. 801,833.   Specification of Letters Patent.   Patented Oct. 17, 1905.

Application filed April 2, 1904. Serial No. 201,243.

*To all whom it may concern:*

Be it known that I, CHARLES M. ALLEN, a citizen of the United States, residing at Worcester, in the county of Worcester and Commonwealth of Massachusetts, have invented a new and useful Improvement in Flow-Registers, of which the following is a specification, accompanied by drawings, forming a part of the same, in which—

Figure 1:
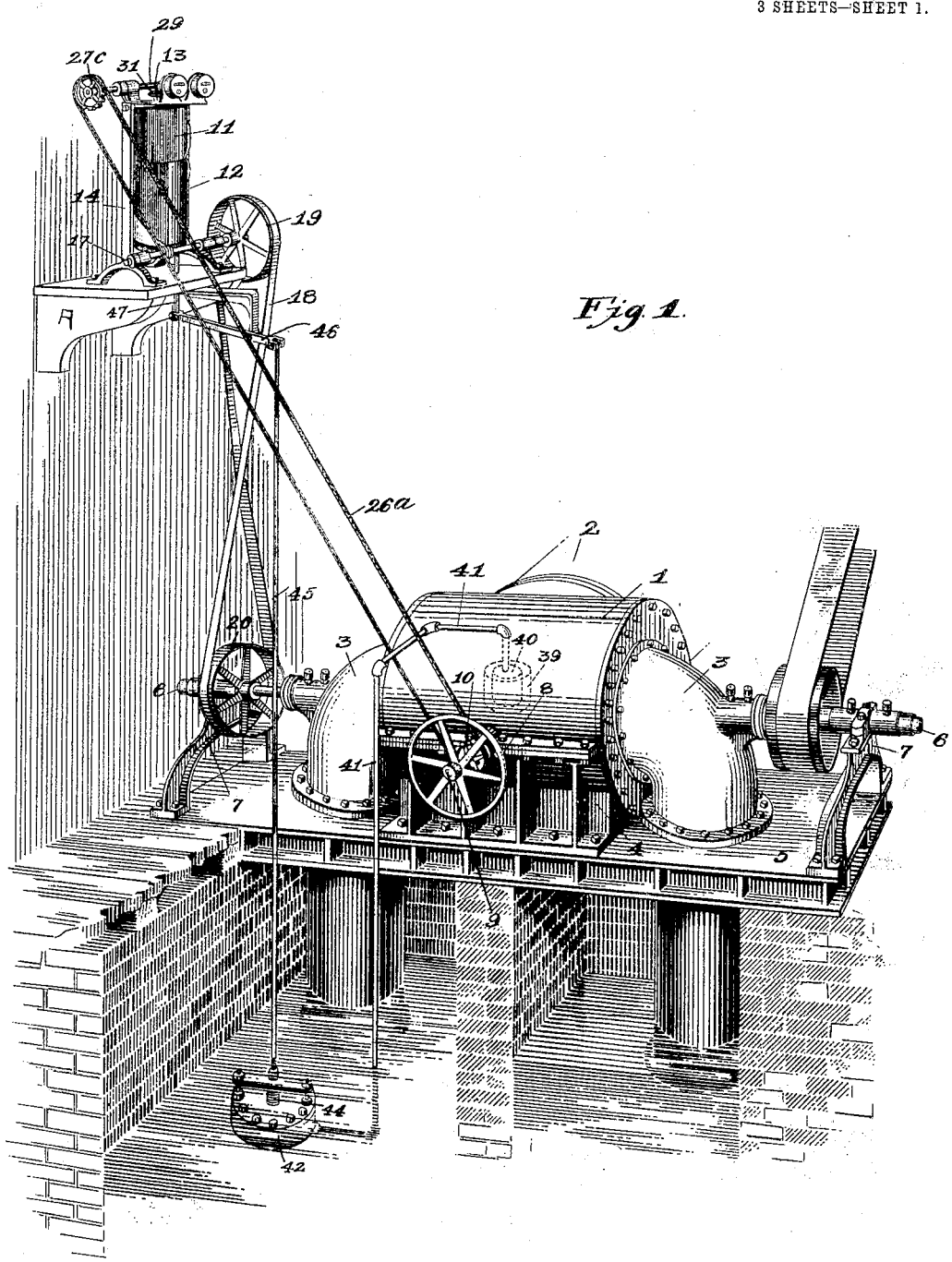
Figure 4:
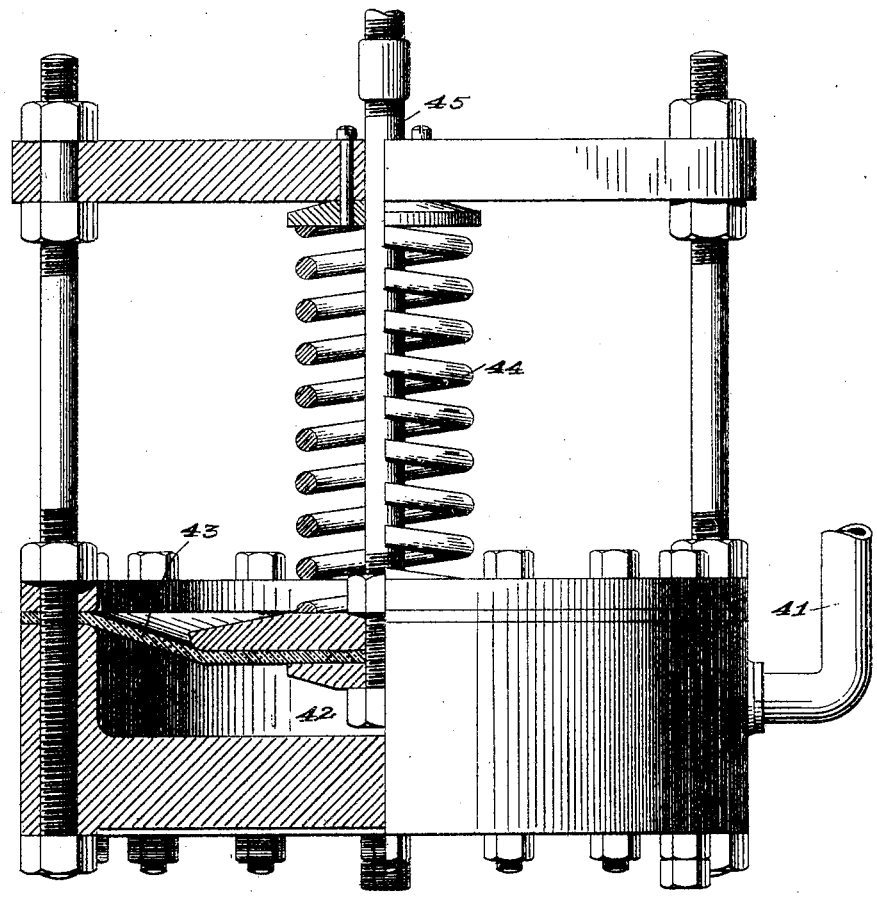
Figure 5:
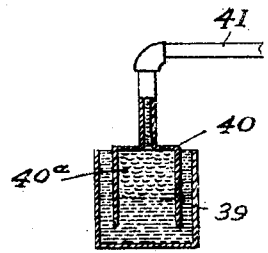

Figure 1 is a view in perspective of my improved flow-register, showing it applied to and operatively connected with the turbine-wheel. Fig. 2 is an enlarged view, in front elevation, of the flow-register. Fig. 3 is a side elevation of the same, and Fig. 4 is an enlarged view of the diaphragm. Fig. 5 is a detached sectional view, on an enlarged scale, of the oil-receptacle in the turbine-casing.

Similar reference letters and figures refer to similar parts in the different views.

In most places where water-power is sold the water-head is kept nearly constant, and observations of it would be required only at long intervals and at times of high or low water. The varying factor then is the amount of gate-opening, and the accuracy of the results will depend largely on the frequency of the reading of this factor. It was to obviate the trouble and expense incident to making these readings that the present invention was devised; and the object of my present invention is therefore to provide a simple and accurate water-meter to automatically measure and record with accuracy the two variables— namely, the gate-opening and the water-head acting on the wheel; and with these objects in view my invention consists in certain novel features of construction and combination of parts, which will be hereinafter described, and pointed out in the claims.

Referring to the accompanying drawings, 1 denotes the turbine-cylinder, into which water is supplied through the pipe 2 and out through the opposite ends of which the water discharges through the pipes 3 3 into the tail-race, as shown in Fig. 1, these parts being mounted in a suitable framework 4 and supported on a bridge-plate 5 in any approved manner. The turbine-wheel (not shown) rotates within the cylinder 1 in the usual manner and is keyed or otherwise secured upon the driven shaft 6, which turns in suitable bearings 7 7 provided therefor. An ordinary gate (not shown) is employed, and the shaft 9 which operates it has a hand-wheel 8 on its forward end, by which it is turned to regulate the extent to which the gate is opened, and to this shaft 9 is secured the sprocket-wheel 10, and the purpose of this sprocket-wheel will be fully explained hereinafter.

Mounted upon a shelf A in a convenient location are two cylinders 11 and 12, having mutilated gear-teeth $11^a$ and $12^a$ thereon, respectively, and supported one above the other, as shown, upon a vertical shaft 13, which latter is supported at its ends in the frame 14 of the register. The upper cylinder is termed the "head-cylinder" and the lower the "gate-cylinder." These two cylinders are independent of each other, although supported on a common axis, and the gate-cylinder 12 is secured to the shaft 13, whereas the head-cylinder is loosely mounted thereon. The gate-cylinder is provided with a worm-wheel 15 at its lower end, and the worm 16 on the shaft 17 engages the worm-wheel and rotates the gate-cylinder 12 continuously and uniformly, the shaft 17, which turns the cylinder 12, being driven by the turbine-shaft 6 through the cross-belt 18, passing over the pulleys 19 and 20, secured to the two shafts 17 and 6, respectively, as shown in Fig. 1. One edge of the toothed section on the cylinder 12 is straight, as shown at 21, and parallel with the axis of rotation, whereas the opposite or mutilated edge of the teeth (indicated at 22) is variable upon a line extending spirally around the cylinder 12. The mutilated or variable edge 22 starts at the lower edge of the cylinder, as shown in Fig. 2, from the straight edge of the toothed section, which latter is the length of the cylinder, and from this point the remaining teeth diminish in length as defined by the variable line 22 until it arrives at nothing at the upper end of the cylinder at a distance from the edge 21, as shown in Figs. 2 and 3. A pinion 23, Fig. 3, is in position to operate in connection with this cylinder and is mounted in a carriage 24, guided in its movements by the shaft 28, and has a spline connection with a shaft 25, upon which it is capable of sliding, but not turning. A sprocket-chain 26 is secured to this carriage 24 and passed over the sprocket-wheel 27 on a shaft 29 and sprocket-wheel $27^a$ on a shaft $27^b$, and the shaft 29 is driven by a sprocket-chain $26^a$, passing around the sprocket-wheel 10 on the gate-screw 9 and sprocket-wheel $27^c$ on one end of the shaft 29, as shown in Fig. 1. In this way the position of the carriage 24 with respect to the height of the cylinder 12 is determined by the extent to which the gate is opened or closed through the turning of the gate-shaft 9. When the gate begins to open, the carriage 24 is opposite the extreme lower end of the cylinder 12 and a complete revolution of the cylinder 12 is necessary to turn the pinion 23 the distance of one tooth, whereas the further opening of the gate causes the carriage 24 to be raised higher upon the shaft 25, and as it is raised higher more teeth of the mutilated gear engage the teeth of the pinion 23, turning the latter correspondingly, and when the gate is opened to its fullest capacity the carriage, with the pinion 23, is raised to a point opposite the extreme upper end of the cylinder 12 and the pinion 23 is given the maximum number of rotations. The rotations of the gate-cylinder 12 are recorded by a register 30 of any known and suitable form of construction, a bevel-pinion 31 being secured on the upper end of the shaft 13 in position to drive a bevel-pinion 32 on the shaft, (not shown,) which actuates the mechanism of the register in the customary manner.

The head-cylinder 11 has its gear-teeth arranged similar to those of the gate-cylinder 12. One edge 33 of the toothed section 11$^a$ is straight and parallel with the axis of the cylinder and the opposite edge 34 of the toothed section is curved, as shown in Figs. 2 and 3. A pinion 35 is designed to intermesh with the teeth 11$^a$ of the head-cylinder and be driven thereby, and this pinion 35 is mounted in a carriage 36, which latter also carries a pinion 37, engaging the pinion 35 and having a spline connection with a shaft 28, on which the pinion 37 slides. The head-cylinder 11 is driven by a pinion 38, secured to the upper end of the shaft 25, and as the shaft 25 is rotated by the gate-cylinder 12 through the pinion 23 the movement of the head-cylinder 11 coincides with the movement of the gate-cylinder 12. The position of the carriage 36 is determined by the water-head in the turbine 1 in the following manner: Within the turbine-casing an oil-reservoir is located. This comprises two cups 39 and 40, Fig. 1, the cup 40 opening downwardly and located within the cup 39, which is open at its upper end to the water in the turbine-case 1. The upper portion of the cup 40 is filled with oil, as shown at 40$^a$, Fig. 5, and from it a pipe 41 leads to the chamber 42. (Shown in Fig. 1 and on a larger scale in Fig. 4.) The chamber 42 is covered with a diaphragm 43, which is submerged in the tail-race, with its upper surface exposed to the water therein. The pressure of the water in the turbine-case acting upon the oil in the cup 40 is transmitted to the under side of the diaphragm 43 and is balanced by a spring 44 acting against the upper side of the diaphragm. The diaphragm 43 is connected by a rod 45 with one end of a multiplying-lever 46. The opposite end of the lever 46 is connected by a rod 47 with the carriage 36, carrying the intermeshing pinions 35 and 37. The rotation of the shaft 28 is recorded by a register 46 of any known and suitable construction, through a bevel-pinion 47 on the upper end of the shaft 28 and a pinion 48 on a shaft 49, which actuates the mechanism of the register 46.

The operation of my flow-register is as follows: The rotation of the turbine imparts a slow rotary motion to the lower gate-cylinder 12. The mutilated gear 12 imparts an intermittent rotary motion to the pinion 23, the extent of the rotation of the pinion 23 being determined by the vertical position of the pinion as the carriage 24 is raised by the opening of the gate. The rotation of pinion 23 is imparted to the upper or head cylinder 11, which, through its mutilated gear 11$^a$ and pinions 35 and 37, imparts an intermittent motion to the shaft 28, and the rotation of the latter is registered by the register 46. The rotation of the shaft 28 as driven by the head-cylinder 11 is determined by the vertical position of the carriage 36, and this is controlled by the pressure of the head of water in the turbine-case 1. The rotation of the shaft 28 is therefore a resultant of two forces—to wit, the pressure of the head of water acting on the wheel and the flow of water past the wheel as measured by the rotation of the wheel itself acting as a meter. Any variation in the opening of the gate will vary the position of the pinion 23 on the gate-drum, and any variation in the pressure against the under side of the diaphragm 43, which of course will occur with any variation in the head of water, will change the position of the pinion 35 on the head-drum. A change in the position of the pinion 23 varies the rotation of the head-drum, which also affects the movement of the pinion 35, and a change in the position of the pinion 35 on the head-drum still further varies its movement, and the resultant of these two changes is registered at the register 46, which is arranged to record the quantity of water flowing through the wheel at a given number of revolutions of the wheel or during a given period of time when the rate of speed of the wheel is known.

What I claim as my invention, and desire to secure by Letters Patent, is—

1. In a flow-register, the combination with a turbine and a rotary cylinder having a set of mutilated gear-teeth thereon, and means for transmitting continuous rotary motion from said turbine thereto, of a water-gate, means for registering the revolutions of said cylinder, and means for controlling said registration by the extent to which said water-gate is opened.

2. A flow-register, comprising a rotary cylinder having a set of mutilated gear-teeth thereon, a turbine, means for transmitting rotary motion from said turbine to said cylinder, a second cylinder of similar construction, means for periodically driving said second cylinder from said first cylinder, shiftable gearing operated by and the motion of which is the resultant of the two mutilated gears, and means for registering the movement of the shiftable gearing.

3. A flow-register, comprising a rotary cylinder having a set of mutilated gear-teeth thereon, a turbine, means for transmitting rotary motion from said turbine to said rotary cylinder, a second cylinder of similar construction, means for periodically driving said second cylinder from said first cylinder, and comprising shiftable gearing operated by and the motion of which is the resultant of the two mutilated gears, means for registering the movement of the shiftable gearing and means for registering the revolutions of the first-named cylinder.

4. In a flow-register, the combination with two cylinders having mutilated gears thereon, said cylinders independent of each other but one driven from the other during a certain portion of its rotation, a water-gate and means for controlling the duration of the connection between the cylinders by the extent to which said water-gate is opened.

5. In a flow-register, the combination with two cylinders having mutilated gears thereon, said cylinders independent of each other and one driven from the other during a certain portion of its rotation, a water-gate, means for controlling the duration of the connection between the cylinders by the extent to which the water-gate is opened, and a register driven during portions of the rotation of the second cylinder controlled by the water-head.

6. In a flow-register, the combination with a gate-cylinder and head-cylinder having mutilated gears thereon, the two cylinders independent of each other and one driven positively by the rotary movement of a water-wheel, means for driving the other intermittently including a sliding gear opposite said gate-cylinder, of a pair of shafts having sliding gears thereon opposite said gate and head cylinders respectively, and independently-operated means for shifting the gears, whereby the motion of one is the resultant of the intermittent motion of the two cylinders.

7. In a flow-register, the combination with two cylinders having mutilated gears thereon, one of which is driven constantly, means for driving the other intermittently by the first including a shiftable gear opposite the first cylinder, a shiftable gear opposite the driven cylinder, a second gear driven by said second shiftable gear and means for registering its speed, substantially as described.

8. In a flow-register, the combination with a water-gate and two cylinders having mutilated gears thereon, one of which is driven constantly, means for driving the other intermittently by the first including a shiftable gear opposite the first cylinder, a second shiftable gear opposite said driven cylinder, a gear driven by said second shiftable gear and means for registering its speed, means for shifting the gears opposite the two cylinders independently, the first shifted by the movement of said gate and the second by the pressure of the water-head.

9. The combination with a gate-cylinder and head-cylinder independent of each other and having mutilated gears thereon, one of which is driven continuously and the other intermittently, of means for driving said head-cylinder intermittently including a shiftable gear opposite the gate-cylinder, a second shiftable gear opposite said head-cylinder, the motion of which is the resultant of the rotation of the two cylinders, and means for registering the said resultant motion and the rotations of the gate-cylinder.

10. In a flow-register, the combination with a water-gate and two cylinders having mutilated gears thereon, of means for continuously rotating one cylinder, two shafts, a movable carriage carrying a single gear-wheel feather-connected to one shaft and adapted to be driven periodically by the mutilated gear on the continuously-rotating cylinder, a movable carriage carrying two intermeshing gear-wheels one of which is feather-connected to the other shaft, and said gear-wheels in position to be driven by the mutilated gear upon the other cylinder, means for driving said second cylinder from said first shaft, one carriage shifted by the movements of said gate and the other by said water-head.

11. In a flow-register, the combination with a water-gate and two cylinders having mutilated gears thereon, of means for continuously rotating one cylinder, two shafts, a movable carriage carrying a single gear-wheel feather-connected to one shaft and adapted to be driven periodically by the mutilated gear on the continuously-rotating cylinder, a movable carriage carrying two intermeshing gear-wheels one of which is feather-connected to the other shaft, and said gear-wheels in position to be driven by the mutilated gear upon the other cylinder, means for driving said second cylinder from said first shaft, means for shifting one carriage by the movements of said gate, means for shifting the other carriage by the water-head, and registers for registering the rotations of one cylinder and the rotations of the shaft the motion of which is the resultant of the several gears.

12. In a flow-register, the combination with a water-gate, a tail-race and two cylinders having mutilated gears thereon, of means for continuously rotating one cylinder, two shafts, a movable carriage carrying a single gear-wheel feather-connected to one shaft and adapted to be driven periodically by the mutilated gear on the continuously-rotating cylinder, a movable carriage carrying two intermeshing gear-wheels one of which is feather-connected to the other shaft, and said gear-wheels in position to be driven by the mutilated gear upon the other cylinder, means for driving said second cylinder from said first shaft, means for shifting one carriage by the movements of said gate, means for shifting the other carriage by the water-head, a diaphragm submerged in said tail-race controlling said latter carriage, and means for supplying oil thereto from an oil-reservoir in the turbine-casing, an oil-reservoir in the turbine-casing comprising a cup open at the top and an inverted cup inserted therein.

Dated this 24th day of March, 1904.

CHARLES M. ALLEN.

Witnesses:
PENELOPE COMBERBACH,
RUFUS B. FOWLER.